Feb. 21, 1956  O. W. EHLERS  2,735,499
DUAL PURPOSE GAS TURBINE ENGINE
Filed May 21, 1951
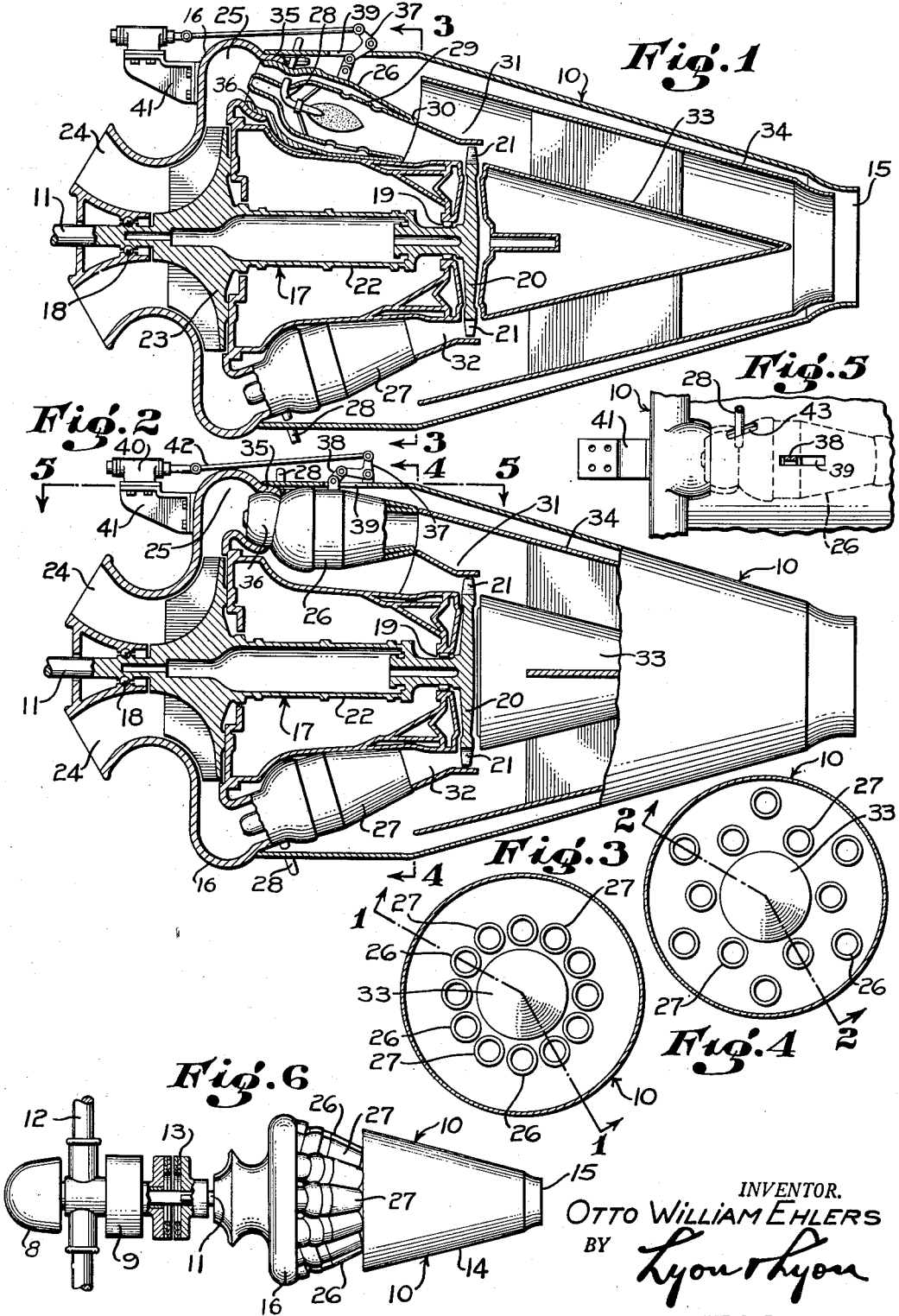
INVENTOR.
OTTO WILLIAM EHLERS
BY Lyon & Lyon
ATTORNEYS United States Patent Office 2,735,499
Patented Feb. 21, 1956

2,735,499

DUAL PURPOSE GAS TURBINE ENGINE

Otto William Ehlers, Hermosa Beach, Calif.

Application May 21, 1951, Serial No. 227,376

14 Claims. (Cl. 170—135.71)

This invention relates to aircraft propulsive devices and is particularly directed to an improved type of gas turbine engine which is particularly adapted for driving an air screw or propeller through a clutch, as well as for providing propulsive thrust by jet reaction.

The present invention relates to improvements in a gas turbine engine particularly adapted for use with the device shown in my copending application for "Propeller Coupler," filed June 14, 1946, Serial No. 676,783, now U. S. Patent No. 2,571,848. In that copending application I have disclosed a gas turbine engine and propeller combination for aircraft propulsion. A clutch device is employed for releasably connecting an air screw or propeller to the shaft of a gas turbine. The present invention contemplates improvements in the gas turbine construction for use in such an installation.

It is known that propulsion by jet reaction is more efficient at high speeds than propulsion by an engine driven air screw, but it is also known that the latter is superior for take-off and for landing. It is the principal object of this invention to provide a gas turbine engine construction which is particularly adapted for driving an air screw or propeller during take-off and landing operations and which also gives gives efficient performance when the propeller is declutched and the engine operating by jet reaction only.

When the gas turbine engine is driving the propeller greater power is required to be delivered through the turbine wheel, and conversely, when the propeller is declutched it is desired to deliver less power to the turbine wheel and deliver more power for jet reaction. In accordance with my invention I provide means for directing exhaust gases from certain of the burner units outside the periphery of the turbine wheel in order that the jet reaction thrust may be increased when the propeller is declutched. When additional power on the turbine shaft is required for driving the propeller the exhaust gas discharge from these burner units may be directed through the turbine blades.

Another object of this invention is to provide a gas turbine engine having a plurality of burner units, some of the burner units being pivotally mounted on the engine frame so that the blast of hot gases discharged therefrom may be directed through the turbine blades or, alternatively, may be passed outside the periphery of the turbine wheel blades to provide propulsive force by jet reaction.

Other and more detailed objects and advantages will appear hereinafter.

In the drawings:

Figure 1 is a longitudinal sectional view of a gas turbine engine embodying my invention taken substantially on the line 1—1 as shown in Figure 3 and showing a pivoted burner unit in position to direct its exhaust gases through the blades of the turbine wheel.

Figure 2 is a view similar to Figure 1 taken on the line 2—2 as shown in Figure 4 and showing the pivoted burner unit moved to a position in which the exhaust gases are discharged outside the periphery of the turbine wheel blades.

Figure 3 is a transverse sectional view in diagrammatic form taken substantially on the line 3—3 as shown in Figure 1.

Figure 4 is a view similar to Figure 3 taken substantially on the line 4—4 as shown in Figure 2.

Figure 5 is a plan view partly broken away taken in the direction of the line 5—5 as shown in Figure 2.

Figure 6 is a side elevation in diagrammatic form showing the air screw or propeller and its clutch.

Referring to the drawings, the gas turbine engine generally designated 10 is provided with a forwardly extending drive shaft 11 which is adapted to drive the air screw or propeller 12 through the releasable clutch device 13 and reduction gearing 9. The gas turbine engine 10 is also provided with a cone assembly 14 having a rear opening 15 through which exhaust gases are discharged for jet reaction.

The engine 10 is provided with a stationary frame 16, and this frame rotatably supports a rotary assembly 17 by means of suitable spaced bearings 18 and 19. The rotatable assembly 17 includes the turbine wheel 20 with its peripheral blades 21, the hollow drive shaft 22, the air compressor 23 and the forwardly extending propeller shaft 11. Air taken in through the inlet passages 24 passes through the compressor and is delivered through passageways 25 to a plurality of individual burner units 26 and 27. The internal arrangement of these burner units may be of known construction and each is provided with a fuel pipe 28 for burning a fuel within the interior of the shell 29. The shell 29 is provided with a discharge outlet 30 through which the blast of hot gases is directed. Stationary parts on the frame 16 define inlet passages 31 and 32 which lead through the blades 21 of the turbine wheel 20. Exhaust gases discharged through the blades 21 pass outside the tail cone 33 and within the tailpipe 34.

In the particular engine illustrated twelve burner units are provided and six of these are pivotally mounted on the frame so that they may be swung to direct their hot gas discharge either through the turbine blades 21 or outside the periphery thereof directly into the tailpiece 34. As shown in the drawings, a socket 35 is provided on the frame to receive a ball portion 36 provided on each of the burner units 26. This ball and socket arrangement permits the burner units 26 to each to be swung from the position shown in Figure 1 to the position shown in Figure 2. Any suitable or desirable shifting mechanism may be employed, and as shown in the drawings I provide a bell crank 37 for each of the burner units 26. The bell cranks 37 are each pivoted on the stationary frame 10 and are connected to the burner units 26 through a link 38. The link 38 operates in a slot 39 to prevent lateral movement of the burner unit 26 within the engine housing. The bell cranks 37 may be connected for dependent operation from a single power source, or if desired each may be provided with a double acting power cylinder 40 supported on a stationary bracket 41 and connected to the bell crank by means of an actuator rod 42.

The fuel pipes 28 which lead to each of the movable burner units 26 pass through slots 43 in the engine housing in order to accommodate the necessary movement of the burner units.

It is to be understood that with the exception of the movable burner units 26 and the mechanism for shifting them, the construction of the various parts of the gas turbine engine may be of conventional design, and therefore such parts are illustrated in diagrammatic form only in sufficient detail to illustrate the features of this invention. It is also to be understood that the clutch device 13 shown in Figure 6 and the air screw 12 are shown in diagrammatic form only. These parts preferably take the form shown in my copending application identified above. The air screw 12 is preferably of the type which may be feathered so that it need not "windmill" when the clutch is disengaged. The feather control mechanism may be positioned within the housing 8, if desired.

In operation, the burner units 26 are pivoted to the position shown in Figure 1 for take-off and for landing operations. In this position the maximum power is delivered to the turbine wheel 20 for driving the air screw or propeller 12 through the clutch 13. After take-off and after the aircraft has reached a desired elevation, the clutch 13 is disengaged, the propeller is feathered, and the burner units 26 are shifted to the position shown in Figure 2. In this position the burner units 26 discharge exhaust gases directly into the tailpiece 34 for jet reaction. The burner units 27 continue to direct their discharge gases through the turbine blades 21 to provide power for driving the compressor 23. When the clutch device 13 is disengaged and when the burner units 26 are in the position shown in Figure 2, the aircraft is propelled by jet reaction alone. When the aircraft is ready to make a landing, the blades of the air screw are returned from feathered position, the clutch device 13 is reengaged to connect the air screw 12 with the shaft 11, and the burner units 26 are shifted to the position shown in Figure 1. The jet reaction thrust is diminished and additional power is delivered to the turbine wheel for driving the air screw 12.

Having fully described my invention, it is to be understood that I do not wish to be limited to the details herein set forth, but my invention is of the full scope of the appended claims.

I claim:

1. In a gas turbine engine, the combination of: a bladed turbine wheel, a plurality of burner units each having a discharge outlet for directing a blast of hot gases into the bladed turbine wheel, a compressor mounted coaxially of the turbine wheel and connected to be driven thereby, means providing a movable mounting for at least one of the burner units so that it may be moved relative to the compressor to a position wherein the blast of hot gases therefrom passes outside the periphery of the turbine wheel.

2. In a gas turbine engine, the combination of: a bladed turbine wheel, a compressor mounted coaxially of the turbine wheel and connected to be driven thereby, a plurality of burner units each having a discharge outlet for directing a blast of hot gases into the bladed turbine wheel, means providing a movable mounting for certain of the burner units relative to the compressor so that they may be moved to a position wherein the blast of hot gases therefrom passes outside the periphery of the turbine wheel.

3. In a gas turbine engine, the combination of: a frame, a turbine wheel rotatably mounted upon the frame and provided with peripheral blades, a compressor mounted on the frame coaxially of the turbine wheel and connected to be driven thereby, a plurality of burner units on the frame each having a discharge outlet for directing a blast of hot gases into the turbine blades, means on the frame providing a movable mounting for certain of the burner units so that they may be moved relative to the compressor to a position wherein the blast of hot gases therefrom passes outside the periphery of the turbine wheel blades.

4. In a gas turbine engine, the combination of: a frame, a turbine wheel rotatably mounted upon the frame and provided with peripheral blades, a compressor mounted coaxially of the turbine wheel and connected to be driven thereby, a plurality of burner units on the frame each having a discharge outlet for directing a blast of hot gases into the turbine blades, pivot means providing a movable mounting for certain of the burner units so that they may be moved relative to the frame and compressor to a position wherein the blast of hot gases therefrom passes outside the periphery of the turbine wheel blades.

5. In a gas turbine engine, the combination of: a bladed turbine wheel, a compressor mounted coaxially of the turbine wheel and connected to be driven thereby, a plurality of burner units each having a discharge outlet for directing a blast of hot gases into the bladed turbine wheel, the burner units being arranged in a series encircling the rotary axis of the turbine wheel, means providing a movable mounting for alternate burner units in the series so that they may be moved relative to the compressor to a position wherein the blast of hot gases therefrom passes outside the periphery of the turbine wheel to produce jet thrust.

6. In a gas turbine engine, the combination of: a turbine wheel provided with peripheral blades, an air compressor mounted coaxially of and connected to be driven by the turbine wheel, a plurality of burner units receiving air from said compressor, a tail cone member, each of the burner units having a discharge outlet through which a blast of hot gases issues, the burner units being arranged in a single circumferential series encircling the rotary axis of the turbine wheel, alternate burner units in the series being mounted so that their hot blasts of discharged gases are directed into the turbine blades and then into the tail cone member, and the other burner units being movably mounted relative to the compressor so that their hot blasts of discharged gases may pass either into the turbine blades or directly into said tail cone member and outside the periphery of the turbine wheel blades.

7. In a gas turbine engine, the combination of: a turbine wheel provided with peripheral blades, a compressor mounted coaxially of the turbine wheel and connected to be driven thereby, a plurality of burner units each having a discharge outlet through which a blast of hot gases issues, the burner units being arranged in a single circumferential series encircling the rotary axis of the turbine wheel, alternate burner units in the series being mounted so that their hot blasts of discharged gases are directed into the turbine blades, a tail cone member receiving gases discharged from the turbine, and the other burner units being movably mounted relative to the compressor so that their hot blasts of discharged gases may pass either into the turbine blades or directly into said tail cone member outside the periphery of the turbine wheel blades.

8. In an aircraft propulsive device, the combination of: a gas turbine engine having a tailpiece through which exhaust gases are discharged for jet reaction, the engine having a bladed turbine wheel and a compressor driven thereby, the engine also having a plurality of burner units receiving air from said compressor, each burner unit having a discharge outlet for directing exhaust gases into the bladed turbine wheel, movable elements at the forward ends of certain of the burner units for supporting them for movement relative to the turbine wheel axis so that they may be moved to a position in which their exhaust gases pass outside the periphery of the turbine wheel and directly into the tailpiece, an airscrew, and means including a releasable clutch device for driving the airscrew from said turbine wheel.

9. In an aircraft propulsive device, the combination of: a gas turbine engine having a tailpiece through which exhaust gases are discharged for jet reaction, the engine having a bladed turbine wheel and a compressor driven thereby, the engine also having a plurality of burner units arranged in a series encircling the turbine wheel axis and receiving air from said compressor, each burner unit having a discharge outlet for directing exhaust gases into the bladed turbine wheel, pivotal means mounting alternate burner units for movement relative to the turbine wheel axis so that they may be moved to a position in which their exhaust gases pass outside the periphery of the turbine wheel and directly into the tailpiece, an airscrew, and means including a releasable clutch device for driving the airscrew from said turbine wheel.

10. In an aircraft propulsive device of the class described, the combination of: a gas turbine engine provided with a tailpiece, a frame, a rotatable turbine wheel provided with peripheral blades, an air compressor carried by the frame and driven by the turbine wheel, an airscrew, means including a releasable clutch device whereby the turbine wheel may drive the airscrew, a plurality of burner units connected to receive air from said compressor, the burner units each having a discharge outlet for directing a blast of hot gases into the turbine blades and then into the tailpiece, movable elements at the forward ends of certain of the burner units for supporting them for movement so that they may be moved to a position wherein the blast of hot gases from them bypasses the turbine blades and is discharged directly into the tailpiece, whereby the energy of the hot gases discharged from the burner units may be combined for driving the airscrew through the clutch device, or may be divided when the clutch device is disengaged to increase the jet reaction force of the gases discharged through the tailpiece.

11. In an aircraft propulsive device of the class described, the combination of: a gas turbine engine including a frame provided with a tailpiece, a turbine wheel provided with peripheral blades and being rotatably mounted upon the frame, an air compressor carried by the frame and driven by the turbine wheel, an airscrew, means including a releasable clutch device whereby the turbine wheel may drive the airscrew, a plurality of burner units on the frame connected to receive air from said compressor, the burner units each having a discharge outlet for directing a blast of hot gases into the turbine blades and then into the tailpiece, pivotal means mounting certain of the burner units for movement upon the frame so that they may be moved to a position wherein the blast of hot gases from them bypasses the turbine blades and is discharged directly into the tailpiece, whereby the energy of the hot gases discharged from the burner units may be combined for driving the airscrew through the clutch device, or may be divided when the clutch device is disengaged to increase the jet reaction force of the gases discharged through the tailpiece.

12. In a gas turbine engine, the combination of: a bladed turbine wheel, a compressor mounted coaxially of the turbine wheel and connected to be driven thereby, a burner unit having a discharge outlet for directing a blast of hot gases into the bladed turbine wheel, and means providing a movable mounting for said burner unit so that it may be moved relative to the compressor to a position wherein the blast of hot gases therefrom passes outside the periphery of the turbine wheel.

13. A gas turbine engine and airscrew combination for propelling an aircraft, comprising: a rotary turbine, a shaft connected thereto, a compressor mounted coaxially of the shaft and driven thereby, a plurality of burner units each having a discharge outlet for directing a blast of hot gases through the turbine, certain of the burner units being movably mounted relative to the compressor so that the hot gases issuing therefrom may be directed to by-pass the turbine, means including a releasable clutch for driving the airscrew from said shaft whereby maximum power may be applied to the shaft by causing hot gases discharging from all burner units to pass through the turbine, and whereby lower power may be applied to the shaft by causing the movable burner units to discharge their hot gases to by-pass the turbine.

14. In an aircraft propulsive device, the combination of: a gas turbine engine having a rearwardly extending tailpiece through which exhaust gases are discharged for jet reaction, the engine having forwardly directed air inlet openings, the engine having a bladed turbine wheel and a compressor driven thereby, the engine also having a plurality of burner units arranged in a series encircling the turbine wheel axis and receiving air from said inlet openings and said compressor, each burner unit having a discharge outlet for directing exhaust gases into the bladed turbine wheel, certain burner units in the series being mounted for movement relative to the turbine wheel axis and compressor so that they may be moved to a position in which their exhaust gases pass outside the periphery of the turbine wheel and directly into the tailpiece.

References Cited in the file of this patent

UNITED STATES PATENTS

| | | |
|---|---|---|
| 1,986,435 | Heinze | Jan. 1, 1935 |
| 2,397,998 | Goddard | Apr. 9, 1946 |
| 2,427,845 | Forsyth | Sept. 23, 1947 |
| 2,474,143 | Forsyth | June 21, 1949 |
| 2,500,537 | Goddard | Mar. 14, 1950 |
| 2,507,657 | Wiessler | May 16, 1950 |
| 2,518,498 | Schulte | Aug. 15, 1950 |
| 2,582,809 | Weir | Jan. 15, 1952 |
| 2,587,649 | Pope | Mar. 4, 1952 |

FOREIGN PATENTS

| | | |
|---|---|---|
| 940,373 | France | May 18, 1948 |